United States Patent
Frey

(10) Patent No.: US 10,502,554 B2
(45) Date of Patent: Dec. 10, 2019

(54) PROCESS AND DEVICE FOR DETERMINING THE 3D COORDINATES OF AN OBJECT

(71) Applicant: Steinbichler Optotechnik GmbH, Neubeuern (DE)

(72) Inventor: Alexander Frey, Bernau a. Chiemsee (DE)

(73) Assignee: CARL ZEISS OPTOTECHNIK GMBH, Neubeuern (DE)

( * ) Notice: Subject to any disclaimer, the term of this patent is extended or adjusted under 35 U.S.C. 154(b) by 67 days.

(21) Appl. No.: 14/837,760

(22) Filed: Aug. 27, 2015

(65) Prior Publication Data

US 2016/0189422 A1 Jun. 30, 2016

(30) Foreign Application Priority Data

Aug. 27, 2014 (DE) .................. 10 2014 012 710

(51) Int. Cl.
  *G01B 11/24* (2006.01)
  *G02B 27/01* (2006.01)
  *G06T 15/50* (2011.01)

(52) U.S. Cl.
  CPC .......... *G01B 11/24* (2013.01); *G02B 27/0172* (2013.01); *G06T 15/50* (2013.01); *G01B 2210/52* (2013.01); *G01B 2210/58* (2013.01); *G02B 27/017* (2013.01); *G02B 2027/014* (2013.01); *G02B 2027/0138* (2013.01);
  (Continued)

(58) Field of Classification Search
  None
  See application file for complete search history.

(56) References Cited

U.S. PATENT DOCUMENTS

2002/0049566 A1 4/2002 Friedrich et al.
2006/0212260 A1* 9/2006 Kopelman ........... A61B 5/1077
                                                                    702/152
(Continued)

FOREIGN PATENT DOCUMENTS

DE          19536297 A1    4/1997
DE     102005043912 B4    8/2006
(Continued)

OTHER PUBLICATIONS

Rusinkiewicz, Szymon, Olaf Hall-Holt, and Marc Levoy. "Real-time 3D model acquisition." ACM Transactions on Graphics (TOG) 21.3 (2002): 438-446.*

(Continued)

*Primary Examiner* — Zhengxi Liu
(74) *Attorney, Agent, or Firm* — Dilworth & Barrese, LLP.; Michael J. Musella, Esq.

(57) ABSTRACT

In a process for determining the 3D coordinates of an object (1), a partial surface of the object (1) is recorded by a 3D measuring device (2), and the 3D coordinates of this partial surface of the object (1) are determined. Additional partial surfaces of the object (1) are recorded by the 3D measuring device (2), and the 3D coordinates of these partial surfaces are determined. The 3D coordinates of the partial surfaces of the object (1) are assembled by a processing device (3). In order to improve this process, the exposures and/or the 3D coordinates of one or more partial surfaces of the object (1) are represented on a head-mounted display (4) (FIG.1).

21 Claims, 5 Drawing Sheets

(52) U.S. Cl.
CPC ............ *G02B 2027/0141* (2013.01); *G06T 2207/30204* (2013.01); *G06T 2207/30244* (2013.01)

(56) References Cited

U.S. PATENT DOCUMENTS

| | | |
|---|---|---|
| 2006/0265177 A1 | 11/2006 | Steinbichler et al. |
| 2008/0064935 A1* | 3/2008 | Wong .................. G06F 19/00 600/300 |
| 2008/0243416 A1 | 10/2008 | Bryll |
| 2010/0007719 A1 | 1/2010 | Frey et al. |
| 2010/0091096 A1 | 4/2010 | Oikawa et al. |
| 2011/0102568 A1* | 5/2011 | Bonnet ................ A61B 5/1114 348/77 |
| 2011/0267431 A1 | 11/2011 | Steinbichler et al. |
| 2013/0028478 A1* | 1/2013 | St-Pierre ............. G01B 17/02 382/103 |
| 2014/0063204 A1 | 3/2014 | Sjercks |
| 2014/0168262 A1* | 6/2014 | Forutanpour ........ G06T 19/006 345/633 |
| 2014/0267010 A1* | 9/2014 | Pasquero ............ G06T 19/006 345/156 |
| 2014/0267770 A1* | 9/2014 | Gervautz ........... H04N 5/23296 348/169 |
| 2015/0070468 A1* | 3/2015 | Pfeffer ................ G01B 21/045 348/46 |
| 2015/0260509 A1* | 9/2015 | Kofman ............. G01B 11/2513 356/601 |
| 2015/0366327 A1* | 12/2015 | LaHood, Sr. ......... A45D 40/30 264/109 |

FOREIGN PATENT DOCUMENTS

| | | |
|---|---|---|
| DE | 102008020772 A1 | 10/2009 |
| DE | 102009032262 A1 | 1/2011 |
| DE | 102009032771 A1 | 1/2011 |
| DE | 102010018979 A1 | 11/2011 |
| DE | 102011011360 A1 | 8/2012 |
| DE | 102011114674 B4 | 1/2015 |
| EP | 1724549 A2 | 11/2006 |
| EP | 2034269 A1 | 3/2009 |
| JP | 2000193433 A | 7/2000 |
| JP | 2006322937 A | 11/2006 |
| JP | 2008256692 A | 10/2008 |
| JP | 2010014718 A | 1/2010 |
| JP | 2010092436 A | 4/2010 |
| JP | 2011112579 A | 11/2011 |
| JP | 2011237430 A | 11/2011 |
| JP | 2014517285 A | 7/2014 |

OTHER PUBLICATIONS

European Search Report dated Jan. 12, 2016.
English Translation of Notification of Grounds for Rejection dated Apr. 4, 2019 from corresponding Japanese Patent Application No. 2015-167617.

* cited by examiner

PROCESS AND DEVICE FOR DETERMINING THE 3D COORDINATES OF AN OBJECT

BACKGROUND OF THE INVENTION

The invention relates to a process for determining the 3D coordinates of an object, a process for calibrating a device for determining the 3D coordinates of an object, and a device for the performance of such a process.

A process for determining the 3D coordinates of the surface of an object, in which a partial surface of the object is determined on the 3D coordinates by means of a 3D measuring device, is known from patent document DE 10 2005 043 912 B4. The 3D measuring device has detectors, the position of which is determined by means of a tracking system. The 3D coordinates of additional partial surfaces of the object are determined by the 3D measuring device. The 3D coordinates of the partial surfaces of the object are assembled by a processing device.

A process for determining the 3D coordinates of an object, in which the object of several reference units is surrounded by reference marks, is known from patent document DE 10 2009 032 262 A1. Several exposures of the object are produced in such a way that a portion of the object and a portion of a reference unit is contained on each.

Patent document DE 10 2010 018 979 A1 discloses a process for determining the 3D coordinates of the surface of an object, in which the surface of the object of a scanner is scanned for the acquisition of object data. The position and the orientation of the scanner are determined for the acquisition of position, such as by means of a tracking system, for example.

A process for determining the 3D coordinates of an object is known from patent document DE 10 2011 011 360 A1, in which the object is positioned in front of a field of reference marks. The object is recorded by a device, which has a projector for projecting a pattern onto the object and a camera connected with the projector. One or several reference marks of the field of reference marks are recorded by one or several reference cameras.

A process for determining the 3D coordinates of an object is known from patent document DE 10 2011 114 674 A1, in which a pattern is projected onto the object, which is recorded by the light of a camera reflected by the object and which is evaluated by the exposures recorded by the camera. Furthermore, reference marks on or next to the object of a reference camera are recorded, whereby the reference camera has a larger visual field than the camera.

SUMMARY OF THE INVENTION

The task of the invention is to propose an improved process and improved devices of the type stated above.

In accordance with the invention, this task is solved in a process for determining the 3D coordinates of an object by the features herein. In the process, a partial surface of the object is recorded by means of a 3D measuring device, and the 3D coordinates of this partial surface of the object are determined. One or several additional partial surfaces of the object are subsequently recorded by means of the 3D measuring device, and the 3D coordinates of these partial surfaces are determined. The exposures can be produced in the form of still images or as video exposures. The 3D coordinates of the partial surfaces of the object are assembled by a processing device. The composition of the 3D coordinates of the partial surfaces can be performed in a superordinate (absolute) coordinate system.

In accordance with the invention, the exposures and/or the 3D coordinates of one or more partial surfaces of the object are displayed on a head-mounted display. The head-mounted display can be worn by an operator. The exposures can be displayed in the form of still images or as video exposures. The handling of the process is facilitated for the operator through the fact that the exposures are reproduced as still images and/or as video exposures and/or 3D coordinates on the head-mounted display.

The head-mounted display can make possible a new, improved type of interaction with the process and the device for determining the 3D coordinates of an object. One advantage may consist of the fact that the hands of the operator can remain free for the positioning of the 3D measuring device, for the retrieval of data, and/or for the control of the process or of the device. The head-mounted display can have the information displayed for the operator by means of at least one display. The operator, of course, can, in contrast to virtual reality goggles, additionally perceive the surrounding area, since the display of the head-mounted display covers only a portion of the field of vision and/or is semi-transparent.

It is possible for the head-mounted display to have a camera, which can record images or videos. These images or videos can be evaluated and displayed, preferably with other data superimposed, on the display of the head-mounted display. This process is also termed "augmented reality". The operation of the head-mounted display can be performed by means of buttons or touch sensors, which can be positioned on the frame of the head-mounted display and/or by means of a voice command that can be issued by means of a microphone and which can be provided on the head-mounted display. Combinations with other devices, such as a wristwatch (or "smartwatch") and/or a remote operating control, for example, are also possible. It is possible to transfer the data from the head-mounted display and/or to the head-mounted display, particularly to transfer it wirelessly, particularly by means of WLAN. The data exchange can be carried out with the processing device, particularly a PC and/or a server on the internet, which can carry out the evaluation of the data.

Advantageous embodiments are described herein.

It is advantageous if the 3D measuring device includes a projector for projecting a pattern onto the object and a camera for recording images of the object. More than one camera can also be present. The pattern is preferably a striped pattern. The pattern can also be projected onto the object as a white light pattern, particularly as a white light striped pattern. It is advantageous if the projector and the camera are connected solidly with one another. The units formed by the projector and the camera can also be termed a "3D sensor".

In accordance with one additional advantageous embodiment, reference marks are recorded. The reference marks can be recorded by the camera, which also records the images of the object. For the exposure of the reference marks, a camera separate from that can, of course, also be present. The separate camera is preferably solidly connected with the projector and the camera or the 3D sensor. The reference marks can be present on the object. They can, of course, also be applied to the object or next to the object.

In accordance with one additional advantageous embodiment, the position and the orientation of the camera or of the 3D sensor are determined by a tracking system. One additional advantageous embodiment is characterized in that the 3D measuring device comprises a scanner, the position and the orientation of which are determined by means of a tracking system. The scanner may be a point scanner or line scanner or surface scanner or tactile scanner (touch probe). The scanner can have detectors that can be recognized by the tracking system, particularly infrared detectors.

In accordance with one additional advantageous embodiment, the 3D measuring device comprises a sensing unit, the position of which is determined by means of a tracking system. The sensing unit is preferably provided on a measuring sensor, which can also be termed a touch probe. In particular, a sensor ball, but also other forms of sensing units, is suitable for use as a sensing unit.

One additional advantageous embodiment is characterized in that the 3D measuring device comprises a photogrammetry camera, and that measuring marks are applied to the object and/or in its vicinity. It is possible to apply measuring marks to the object. The measuring marks can, of course, also be applied in another way and/or be projected onto it. Instead of this or in addition to this, the measuring marks can be applied in the vicinity of the object, such as on a framework and/or bars, for example.

The invention relates, furthermore, to a process for calibrating or for checking the calibration of a device for determining the 3D coordinates of an object. The device for determining the 3D coordinates of the object comprises a 3D measuring device, which comprises a projector for projecting a pattern onto the object and a camera for recording images of the object. The 3D measuring device, which can also be termed a 3D sensor, accommodates a calibration plate from a first position. The 3D measuring device can record the calibration plate from one or several additional positions. In accordance with the invention, the exposure and/or the additional exposure or exposures are displayed on a head-mounted display. The additional exposure or exposures can be recorded from one or several additional positions. In these additional positions, the positioning of the 3D measuring device relative to the calibration plate is changed. This can be done through the fact that the 3D measuring device and/or the calibration plate can be moved.

The 3D measuring device can be designed as already described above. The display on the head-mounted display can have the features already described above.

It is advantageous if the head-mounted display has a data reception device for the reception of data from a or from the processing device, particularly a PC. The data reception device can, in particular, be a WLAN module.

In accordance with one additional advantageous embodiment, the head-mounted display has a data transmission device for the transfer of data to a or to the processing device, particularly to a PC. The processing device can be the processing device receiving data from the head-mounted display, or be a separate processing device. The data transmission device can comprise a microphone and/or a touchscreen panel and/or a WLAN module.

Additional data can be displayed on the head-mounted display. This data is preferably transferred to the head-mounted display. This particularly involves data that is used by the operator. The data can include the position of the 3D measuring device, the measuring volume, the measuring range of the tracking system, and/or exposure settings of the camera.

It is advantageous if the data is transferred from the head-mounted display. This data can, in particular, involve voice commands, measuring parameters, the exposure time of the camera, the exposure value of the camera, and/or commands for triggering a measurement.

In a device for the implementation of the process in accordance with the invention for determining the 3D coordinates of an object, the task forming the basis for the invention is solved by the features herein. The device in accordance with the invention comprises a 3D measuring device for recording partial surfaces of the object and for determining the 3D coordinates of these partial surfaces of the object, a processing device, particularly a PC, for assembling the 3D coordinates of the partial surfaces of the object, and a head-mounted display for displaying the exposures and/or of the 3D coordinates of one or more partial surfaces of the object.

In a device for the implementation of the process in accordance with the invention for calibrating a device for determining the 3D coordinates of an object, the task forming the basis for the invention is solved by the features herein. The device in accordance with the invention comprises a 3D measuring device, which comprises a projector for projecting a pattern onto the object and a camera for recording images of the object. The device comprises, furthermore, a calibration plate and a head-mounted display for displaying one or more exposures of the camera.

Advantageous embodiments of the devices in accordance with the invention are described herein.

BRIEF DESCRIPTION OF THE DRAWINGS

Embodiments of the invention are individually explained in the following by means of the attached diagrams. The diagrams depict the following.

DESCRIPTION OF THE PREFERRED EMBODIMENTS

Figure 1:
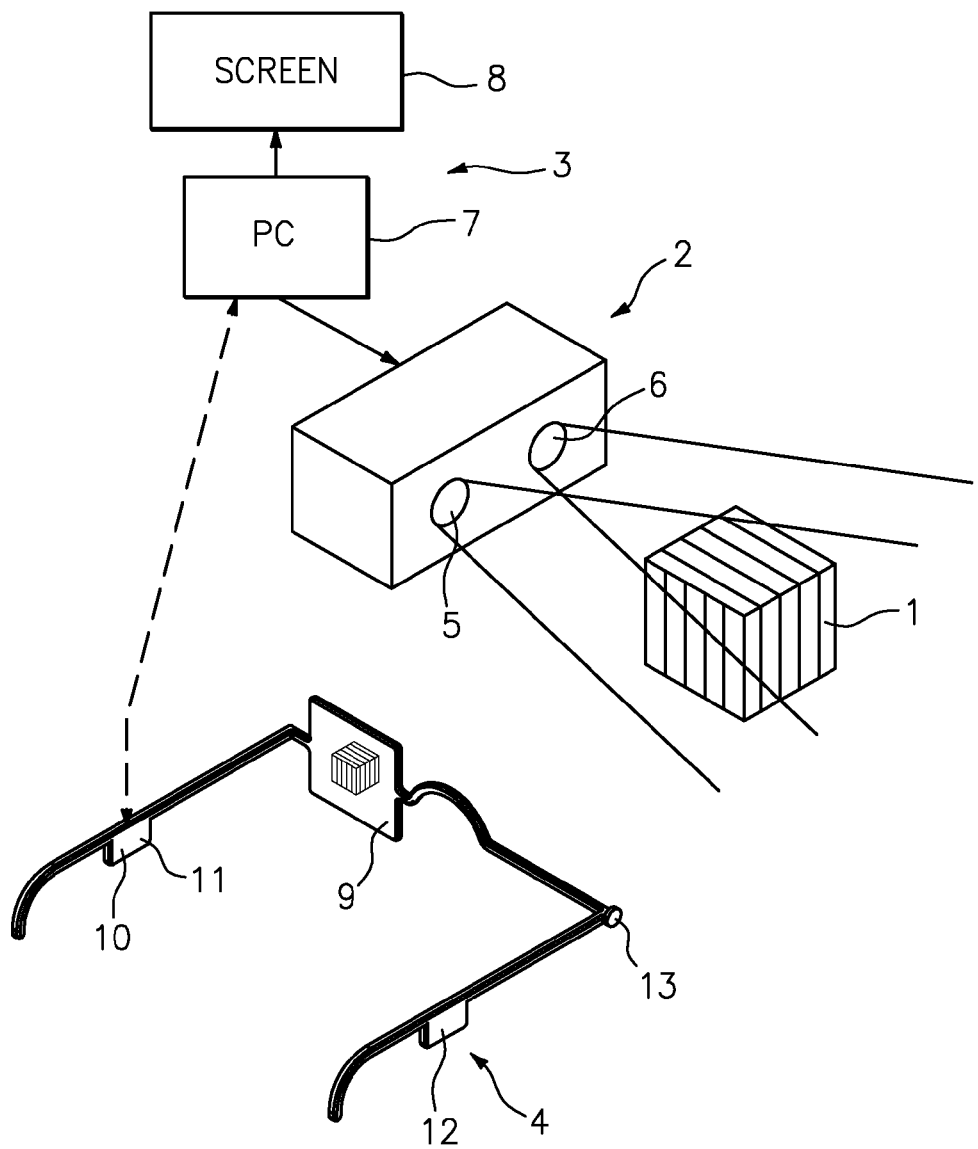
FIG. 1: A device for determining the 3D coordinates of an object with a 3D measuring device, which comprises a projector and a camera and has a head-mounted display.

The device for determining the 3D coordinates of an object 1 which is depicted in FIG. 1 comprises a 3D measuring device 2, a processing device 3, and a head-mounted display 4. The 3D measuring device 2 is designed as a 3D sensor. It comprises a projector 5 for projecting a pattern onto the object 1 and a camera 6 for recording images of the object 1. The projector 5 projects a striped pattern with white light onto the object 1.

The processing device 3 comprises a computer, specifically a PC 7, which has a monitor screen 8.

The head-mounted display 4 comprises a display 9, a data reception device 10, a data transmission device 11, an additional data transmission device 12, and a microphone 13. The display 9 is designed as a transparent disk of glass or of another material, particularly plastic. It is located in front of the eye of the operator. The data reception device 10 and the data transmission device 11 are positioned on a bracket of the head-mounted display 4. They are formed by a WLAN module. The additional data transmission device 12 is provided on the other bracket of the head-mounted display 4. It is designed as a touchscreen panel. The microphone 13, which likewise serves as a data transmission device, is positioned on the forward end of a bracket of the head-mounted display 4.

In order to determine the 3D coordinates of the object 1, it is necessary to produce several different exposures of the object 1. For this, the 3D measuring device 2 and the object 1 must be moved relative to one another. Initially, a first partial surface of the object 1 is recorded. After that, the relative position of the 3D measuring device 2 to the object 1 is changed, and the object 1 is recorded by the camera 6 of the 3D measuring device 2 from another perspective. The exposures of the object 1 can overlap.

During the operation, an exposure of the object 1 can be displayed on the head-mounted display 4, particularly the first exposure. The operator can check whether the exposure of the object 1 has the correct position and can change this position upon need. This is possible to do in a rapid and simple manner, since the operator sees the exposure in the display 9 of the head-mounted display 4 and does not need the monitor screen 8 of the processing device 3 for that purpose. He/she does not, therefore, have to change his/her position in order to reach the monitor screen 8. The operator does not, in particular, have to control the exposure of the camera 6 on the monitor screen 8 in order to adjust the position of the 3D measuring device 2.

During the orientation of the 3D measuring device 2, additional parameters, such as the exposure time for the camera 6, for example, can be set. If the 3D measuring device 2 is positioned correctly, then the measurement can be triggered. The partial surface of the object 1 is recorded, and the 3D coordinates of the partial surface of the object 1 are determined.

The 3D measuring device 2 is subsequently positioned in a new perspective for the object 1. The exposure and/or the 3D coordinates of the first or of the previous partial surface of the object 1 can thereby be displayed on the head-mounted display 4. By this means, the positioning of the 3D measuring device 2 can be facilitated for the operator. The operator can, in particular, position the 3D measuring device 2 in such a way that the new exposure to be produced partially overlaps with the previous exposure.

The 3D coordinates of the partial surfaces of the object are assembled by the processing device 3 and transferred into a global coordinate system. It is thereby possible to control the quality of the 3D coordinates before the next exposure of the object 1 is made.

The head-mounted display 4 can display the live image of the camera 6 on the display 9. Furthermore, measuring parameters can be displayed. It is possible for the measurement to be triggered, such as by means of a voice command, for example, which is received and transferred by the microphone 13. The operator can thereby optimally position the 3D measuring device 2 and/or the object 1 and trigger the measurement without having to turn back to the PC 7 or its monitor screen 8, as the case may be.

After the measurement, the quality of the 3D data and of the orientation can be processed and/or displayed. It can likewise be displayed on the display 9 of the head-mounted display 4. Only then does the operator have to turn back to the PC 7 or its monitor screen 8, if the object 1 has been completely recorded.

The following process can be carried out with the embodiment in accordance with FIG. 1: During the measurement of the object 1 with the 3D measuring device 2, the operator must move the 3D sensor 2 and/or the object 1 so that the object 1 can thereby be recorded from different perspectives and the 3D data of the entire object 1 can be assembled. The live camera image of the camera 6 of the 3D measuring device 2 is recorded by the PC 7 and transferred, by means of WLAN, to the display 9 of the head-mounted display 4. In addition, the current position of the 3D sensor 2, the measuring volume, and additional status information can be displayed on the display 9. Through that fact, the operator can judge which partial surfaces can be recorded and/or whether the exposure settings of the camera 6, for example, are correct.

The operator can adjust the measuring parameters, such as the exposure time and the triggering of the measurement, for example, by means of voice commands, which are transferred by the microphone 13 or by the touchscreen panel 12 on the head-mounted display 4. The commands are transferred from the head-mounted display 4 and to the PC 7 by means of WLAN.

The PC 7 carries out the 3D measurement. By means of the projector 5, different patterns are thereby projected onto the object 1, which the camera 6 records. The PC 7 computes the 3D data from that. After the measurement, the PC 7 can analyze the quality of the 3D data and the orientation of the 3D sensor 2 and display the result on the display 9 on the head-mounted display 4.

The operator can confirm the measurement, such as by means of a voice command, for example, which is transferred by the microphone 13 or by the touchscreen panel 12, through which the PC 7 adds this 3D data to the 3D data already recorded. This step can also be carried out automatically. The operator then proceeds, so that an additional partial surface of the object 1 is recorded. This process is repeated until the object 1 has been completely recorded. Only then does the operator have to turn back to the PC 7 again.

Figure 2:
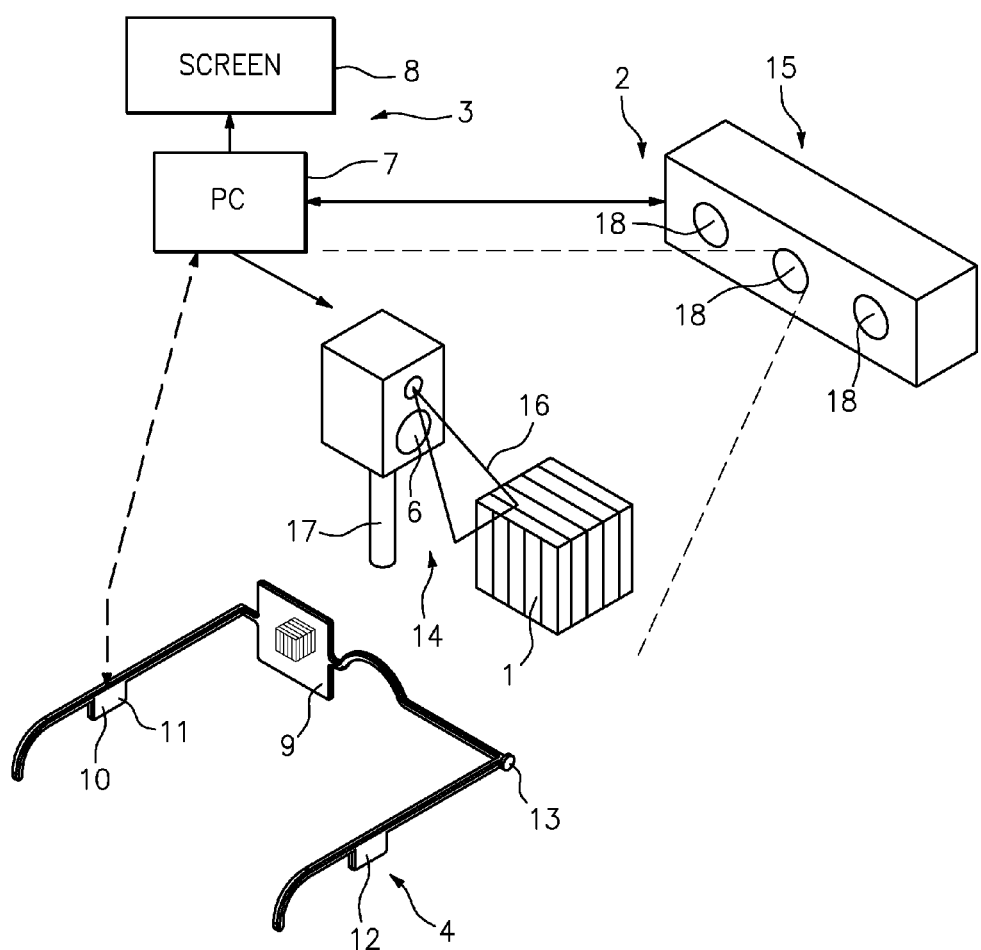
FIG. 2: A device for determining the 3D coordinates of an object with a scanner, a tracking system, and a head-mounted display.

In the embodiment in accordance with FIG. 2, corresponding parts are identified with the same reference numbers; they will not be described again. Here, the 3D measuring device 2 comprises a scanner 14 and a tracking system 15. The scanner 14 is designed as a line carrier. It comprises a scanning device, which projects a laser line 16 onto the object 1, and a camera 6 which records the object 1, including the laser line 16 projected onto the object 1 and its surroundings. Furthermore, the scanner 14 is designed as a handheld scanner with a handle 17.

The tracking system 15 comprises three cameras 18. Detectors (not depicted in the diagram), which can be recorded by the cameras 18, are positioned on the scanner 14. In this way, the tracking system 15 determines the position and the orientation of the scanner 14.

During the operation, an exposure of a partial surface of the object 1 is produced by means of the scanner 14. This can be done by the laser line 16 sweeping a partial surface of the object 1. The previously recorded partial surface of the object 1 can be displayed on the display 9 of the head-mounted display 4. In this way, the operator learns which partial surfaces of the object 1 have already been recorded and which partial surfaces of the object 1 still have to be recorded.

A switch (not depicted in the diagram), by means of which an exposure of the object 1 can be started and/or ended, can be provided on the scanner 14, particularly on its handle 17. The measuring volume of the tracking system 15 can be displayed on the display 9 of the head-mounted display 4. In this way, the operator can ensure that the scanner 14 is within the measuring volume of the tracking system 15. For the complete recording of the object 1, it may be necessary to position the tracking system 15 relative to the object 1 at another point. This conversion of the tracking system 15 can also be controlled by means of a displaying on the display 9 of the head-mounted display 4.

The following process can be carried out by means of the embodiment in accordance with FIG. 2: During the measurement of the object 1 with the 3D measuring device 2, the operator must move the scanner 14 and/or the object 1, so that the object 1 can be recorded from different perspectives and the 3D data of the entire object 1 can be assembled. The scanner 14 is usually guided by the operator by hand and is thereby recorded by the stationary tracking system 15 in order to be able to transfer the data to a common coordinate system.

The image of the camera 6 of the scanner 14 is recorded by the PC 7. Furthermore, the current position of the scanner 14, which has been determined by the tracking system 15, is recorded by the PC 7. The image of the camera 6 of the scanner 14 and/or the current position of the scanner 14 can be transferred and displayed on the display 9 of the head-mounted display 4 by means of WLAN. In addition, additional status information can be displayed, particularly the information about whether the scanner 14 is within the valid measuring volume of the tracking system 15.

The operator can adjust the measuring parameters, such as the scanning rate of the scanner 14 and the triggering of the measurement, for example, by means of voice commands, which are transferred by the microphone 13 or by the touchscreen panel 12 on the head-mounted display 4. The commands are transferred by means of WLAN to the head-mounted display 4 on the PC 7.

The PC 7 computes the 3D data from the data of the scanner 14 and the tracking system 15, and adds this to the 3D data already recorded and computed. During the scanning, information can also be displayed, by means of the recorded 3D data, on the display 9 of the head-mounted display 4. By that means, the operator can judge which partial surfaces of the object 1 can be recorded and/or whether the adjustments of the scanner 14 are correct, particularly its exposure settings. After measuring, the PC 7 can analyze the quality of the 3D data and the orientation of the scanner 14 and display the result on the display 9 of the head-mounted display 4.

The operator can confirm the measurement, such as by means of a voice command, for example, which is transferred by the microphone 13 or by the touchscreen panel 12, through which the PC 7 adds this 3D data to the 3D data already recorded. This step can also be carried out automatically. The operator then proceeds, so that an additional partial surface of the object 1 is recorded. This process is repeated until the object 1 has been completely recorded. Only then does the operator have to turn back to the PC 7 again.

Figure 3:
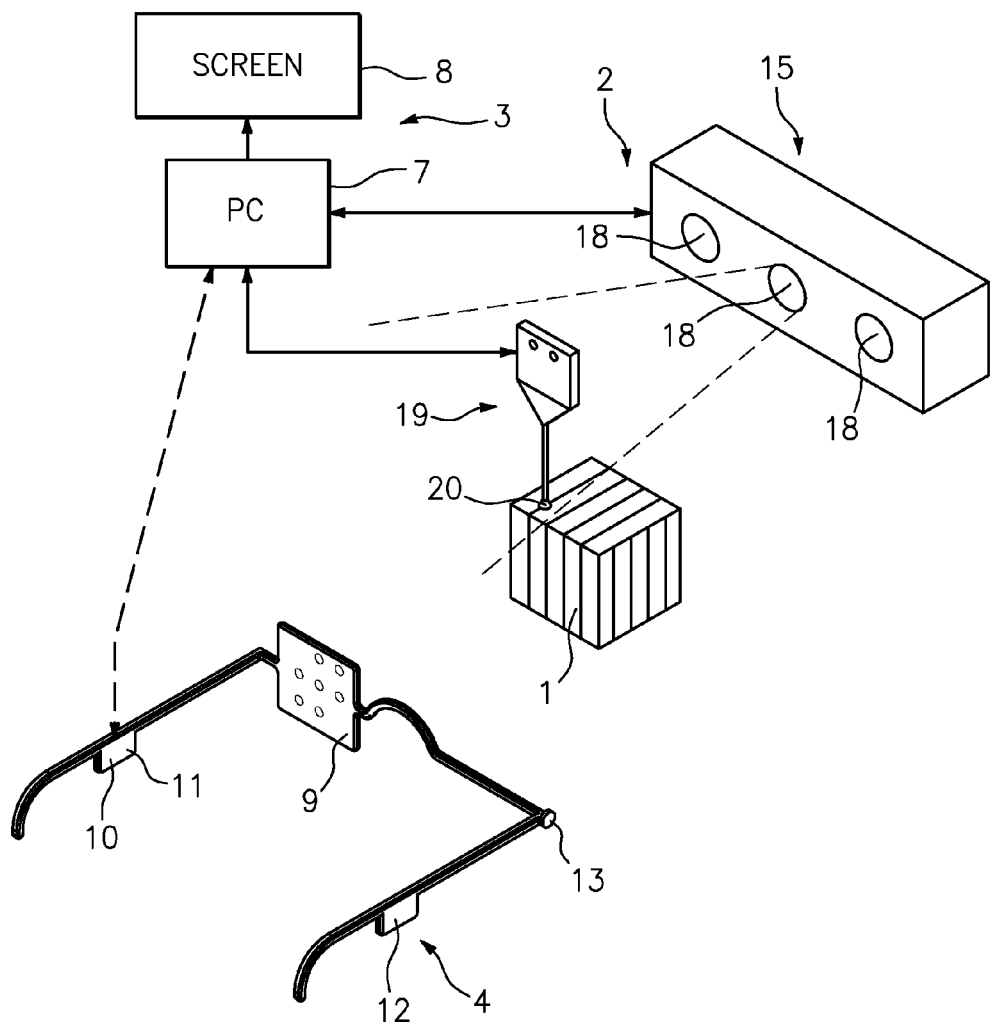
FIG. 3: A device for determining the 3D coordinates of an object with a measuring sensor, on which a sensing unit, a tracking system, and a head-mounted display are provided.

In the embodiment in accordance with FIG. 3, corresponding parts are identified with the same reference numbers, so that they do not have to be described again. Here, the 3D measuring device 2 comprises a measuring sensor 19, which may also be termed a "touch probe", and a tracking system 15. A sensing unit 20, which is designed as a sensor ball, is provided on the measuring sensor 19. In addition, detectors, which can be recorded by the cameras 18 of the tracking system 15, so that the tracking system 15 can determine the position and the orientation of the measuring sensor 19, are positioned on the measuring sensor 19. The measuring sensor 19 can be designed as a handheld measuring sensor 19 with a handle. Instead of this or in addition to this, it can, of course, also be implemented in another way, such as by means of a handling device, particularly by means of an industrial robot, for example.

During the operation, the surface of the object 1 of the sensing unit 20 is scanned. The sensing unit 20 and the object 1 are moved relative to one another. If the sensing unit 20 contacts the surface of the object 1, a measurement can be triggered. This can be carried out automatically. Instead of this or in addition to this, this can also be carried out by hand, particularly by the operator activating a switch or pushbutton, which may located on the measuring sensor 19 and/or at another point, particularly on the head-mounted display 4. The triggering can also be done in another way, such as by means of a voice command, for example, which is transferred by the microphone 13 or by the touchscreen panel 12.

On the display 9 of the head-mounted display 4, the measured points can be displayed on the surface of the object 1. This way, the operator can determine whether permissible measuring points have been determined and/or which additional measuring points still need to be determined.

The following process can be carried out by means of the embodiment in accordance with FIG. 3: During the measurement of the object 1 with the 3D measuring device 2, the operator must move the sensing unit 20 and/or the object 1 in order for the sensing unit 20 to touch the surface of the object 1 at different points, so that the required 3D data of the object 1 can be assembled from different measuring points. The sensing unit 20 is usually guided by the operator by hand and is thereby recorded by the stationary tracking system 15 in order to be able to transfer the data to a common coordinate system.

The current position of the sensing unit 20 is computed by the PC 7. It can be transferred by means of WLAN and displayed on the display 9 of the head-mounted display 4. In addition, additional status information can be displayed, particularly the information about whether the sensing unit 20 is within the valid measuring volume of the tracking system 15.

The operator can adjust the measuring parameters on the head-mounted display 4, such as the characteristics of the sensing unit 20, for example, by means of voice commands, which are transferred by the microphone 13 or by the touchscreen panel 12. The commands can be transferred by means of WLAN from the head-mounted display 4 to the PC 7. The point recognition can likewise be triggered by means of the head-mounted display 4 or by means of a switch on the measuring sensor 19. It is advantageous to trigger the point recognition by means of the head-mounted display, so that the sensing unit 20 is not inadvertently moved, during the point recognition, by means of pressure to the switch on the measuring sensor 19.

The PC 7 computes the 3D data from the data of the sensing unit 20 and the tracking system 15, and adds this to the 3D data already recorded and computed. During the point recognition, information can also be displayed on the display 9 of the head-mounted display 4 by means of the recorded 3D data. By that means, the operator can judge which partial surfaces of the object have already been recorded and/or still have to be recorded. Also, the characteristics of scanned geometry elements, such as the diameter of boreholes, for example, can be displayed on the display 9 of the head-mounted display 4. The operator can continue with additional measurements there. He/she only has to turn back to the PC 7 or to its monitor screen 8, as the case may be, after the complete recording of the object 1.

Figure 4:
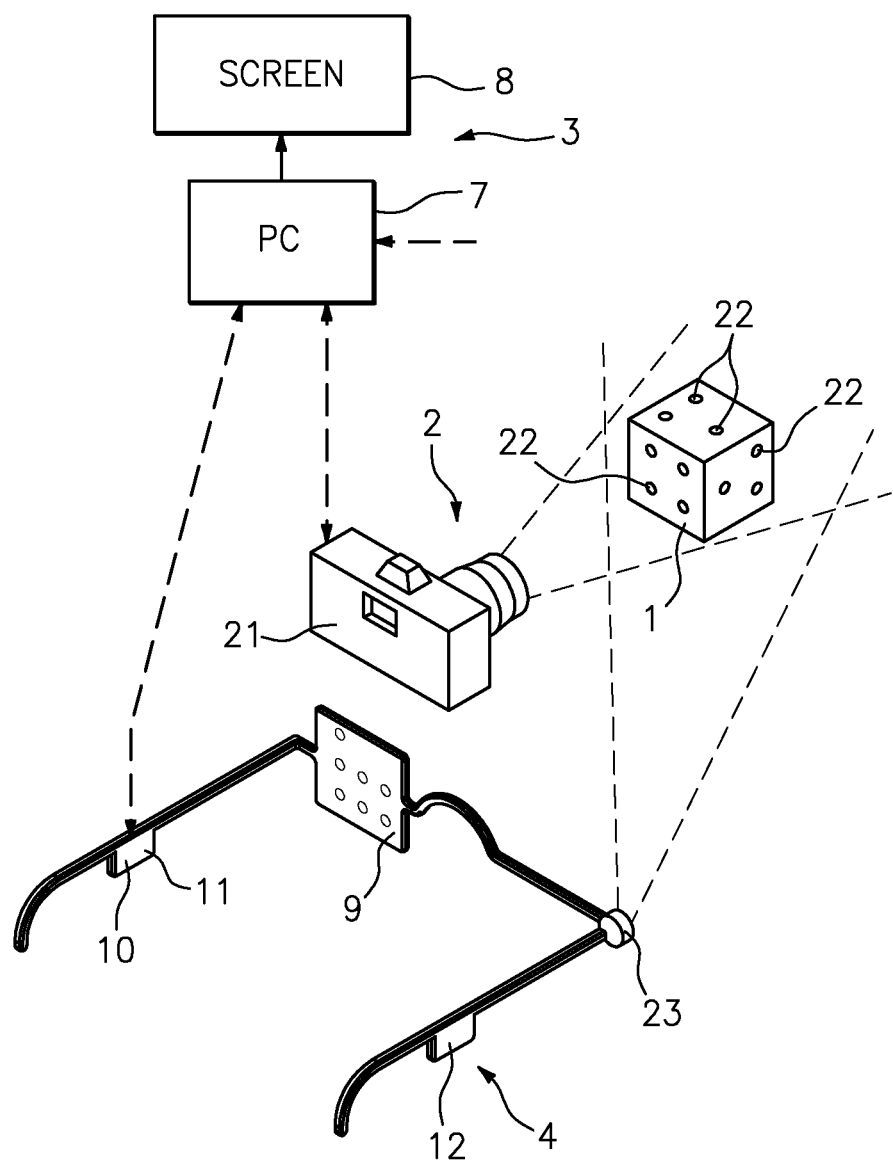
FIG. 4: A device for determining the 3D coordinates of an object, with a photogrammetry camera and a head-mounted display.

In the embodiment in accordance with FIG. 4, corresponding parts are identified with the same reference numbers; they will not be described again. Here, the 3D measuring device 2 comprises a photogrammetry camera 21. Measuring marks 22 are applied to the object 1. The measuring marks 22 can be coded. It is thereby possible for the measuring marks 22 themselves to be coded. Instead of this or in addition to this, it can be coded by means of its apparatus.

During the operation, an exposure of a partial surface of the object 1 with the measuring marks 22 on it is produced by means of the photogrammetry camera 21. The previously recorded partial surface of the object 1 can be displayed on the display 9 of the head-mounted display 4. In this way, the operator learns which partial surfaces of the object 1 have already been recorded and which partial surfaces of the object 1 still have to be recorded.

An actuator, by means of which an exposure of the object 1 can be triggered, is provided on the photogrammetry camera 21.

The following process can be carried out by means of the embodiment in accordance with FIG. 4: During the measurement of the object 1 with the photogrammetry camera 21, the operator must move the photogrammetry camera 21 and/or the object 1, so that the object 1 can be recorded from different perspectives and the 3D data of the entire object 1 can be assembled. The object 1 or a suitable framework is usually given measuring marks 22, and their position is computed as a 3D point list.

The images of the photogrammetry camera 21 can be sent, by radio, to the PC 7, which computes the 3D point list from them. These 3D points can be transferred and displayed on the display 9 of the head-mounted display 4 by means of WLAN. In addition, additional status information can be displayed, particularly about the quality of the 3D points and/or information about which areas of the object 1 still need to have exposures made and/or whether the exposure settings of the photogrammetry camera 21 are correct.

An additional camera 23 is provided on the head-mounted display 4. The camera 23 is positioned on the forward end of a bracket of the head-mounted display 4. The operator can additionally record one or several additional images with the camera 23. The exposure of the images can be triggered by means of voice commands, which are transferred by the microphone 13 or by the touchscreen panel 12, on the head-mounted display 4. These images can likewise be transferred to the PC 7, such as by means of WLAN, for example. This can also be done on an ongoing basis. In this way, a live video can be produced and displayed.

The PC 7 computes the current position of the head-mounted display 14 in reference to the 3D point list from the images of the camera 23. This position can, in turn, be transferred to the display 9 of the head-mounted display 4 and be displayed there. By that means, the operator can, in particular, judge in which areas of the object 1 that additional images of the photogrammetry camera 21 are necessary. This process is repeated until the object 1 has been completely recorded. Only then does the operator have to turn back to the PC 7 or to its monitor screen 8 again, as the case may be.

Figure 5:
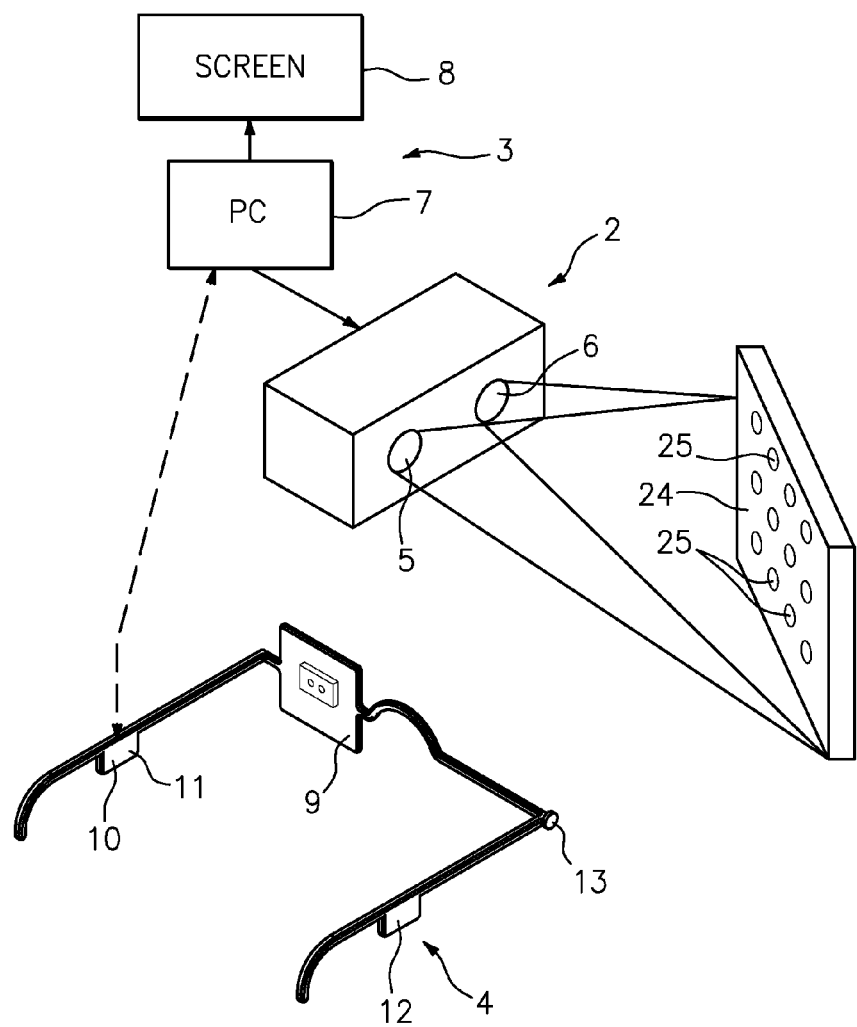
FIG. 5: A device for calibrating a device for determining the 3D coordinates of an object with a 3D measuring device, which comprises a projector and a camera and has a head-mounted display.

In the embodiment in accordance with FIG. 5, corresponding parts are again provided with the same reference numbers, so that they do not have to be described again. FIG. 5 depicts a device for the implementation of a process for calibrating a device for determining the 3D coordinates of an object. The device comprises a 3D measuring device 2, a calibration plate 24, and a head-mounted display 4. The 3D measuring device is designed, as in the embodiment in accordance with FIG. 1, as a 3D sensor. Measuring marks 25 are applied to the calibration plate 24.

During the operation, the operator moves the 3D sensor 2 and/or the calibration plate 24, so that the calibration of the system can be computed from different, predetermined perspectives on the calibration plate 24. This is advantageous or necessary in order for absolutely accurate 3D data to be able to be produced during the subsequent measurements.

The live camera image of the 3D sensor 2 is recorded by the PC 7 and transferred to the display 9 of the head-mounted display 4 by means of WLAN. The next measuring position is also displayed on the display 9. In addition, additional status information can be displayed. By that means, the user can, for example, judge whether the exposure settings of the camera 6 of the 3D sensor 2 are correct.

The operator adjusts the measuring parameters, particularly the exposure time. This can be done by means of voice commands, which are recorded by the microphone 13 and/or by the touchscreen panel 12, on the head-mounted display 4. The measurement can subsequently be triggered as described above. The commands are transferred by means of WLAN to the head-mounted display 4 on the PC 7.

The control PC 7 carries out the calibration measurement. Different patterns are thereby projected onto the calibration plate 24 by means of the projector 5 of the 3D sensor, which the camera 6 of the 3D sensor 2 records. The PC 7 can compute the calibration data from that. After the measurement, the PC 7 can analyze the quality of the data and display the result on the display 9 of the head-mounted display 4.

The operator can confirm the measurement, which can be done by means of voice commands on the microphone 13 or the touchscreen panel 12. Through the confirmation, the PC 7 accepts the calibration data. This step can, of course, also be carried out automatically.

The operator subsequently moves the 3D sensor 2 and/or the calibration plate 24 again and carries out the processes described again. He/she only has to turn back to the PC 7 or its monitor screen 8, as the case may be, if all calibration measurements have been carried out. The PC 7 computes the sensor calibration from that automatically.

The invention claimed is:

1. A process for determining 3D coordinates of an object, comprising:
   recording a partial surface of the object by a camera of a 3D measuring device, the 3D measuring device including a projector for projecting a pattern onto the object and the camera for recording images of the object, and determining 3D coordinates of the partial surface of the object,
   displaying the 3D coordinates of the partial surface of the object on a head-mounted display, said head-mounted display being at least semi-transparent,
   observing the object through the head-mounted display while displaying the 3D coordinates,
   moving at least one of the 3D measuring device or the object relative to each other while observing the object through the head-mounted display,
   recording additional and different partial surfaces of the object by the camera of the 3D measuring device, and determining 3D coordinates of the additional partial surfaces, assembling the 3D coordinates of the partial surface and the additional partial surfaces of the object by a processing device, and displaying the assembled 3D coordinates of one or more of the partial surface and additional partial surfaces of the object on the head-mounted display, wherein graphically visualized spatial limitations of the 3D measuring device, in addition to the assembled 3D coordinates, are displayed on the head-mounted display to augment observation through the head-mounted display.

2. A process in accordance with claim 1, wherein the camera records reference marks.

3. A process in with claim 1, wherein the position and the orientation of the 3D measuring device are determined by a tracking system.

4. A process in accordance with claim 1, wherein the 3D measuring device comprises a photogrammetry camera, and that, measuring marks are applied to the object and/or in its vicinity.

5. A process in accordance with claim 1, wherein additional data is displayed on the head-mounted display, wherein the additional data displayed on the head-mounted display comprises settings of the camera.

6. The process in accordance with claim 5, wherein the settings of the camera displayed on the head-mounted display comprise exposure settings of the camera.

7. The process in accordance with claim 1, wherein the spatial limitations of the measuring device displayed on the head-mounted display comprise a measuring volume of the measuring device.

8. A process in accordance with claim 1, wherein the head-mounted display has a data reception device for the reception of data from a processing device and the head-mounted display has a data transmission device for the transfer of data to the processing device, wherein the data transmitted from the head-mounted display to the processing device comprises control commands for controlling the processing device and/or the measuring device, the control commands being input into the head-mounted display by means of a user interface.

9. A process in accordance with claim 8, wherein the measuring device is a hand-held device communicating with the processing device for receiving control commands, and wherein the head-mounted display is communicating with the processing device for controlling exposure settings of the camera of the measuring device according to the input by a user into the head-mounted display.

10. The process in accordance with claim 1, wherein the spatial limitations of the 3D measuring device displayed on the head-mounted display comprise a measuring volume of a tracking system for tracking a position and orientation of the measuring device, wherein the measuring device is movable relative to the tracking system and the tracking system has at least one sensor for determining the position of the measuring device relative to the tracking system.

11. The process in accordance with claim 10, wherein the tracking system is a stationary system having at least one sensor for determining the position of the measuring device.

12. The process in accordance with claim 1, wherein at least one of one or more measuring parameters of the 3D measuring device or a measurement operation through the 3D measuring device is controlled using the head mounted display.

13. A device for the implementation of the process in accordance with claim 1, comprising: a 3D measuring device for recording partial surfaces of the object and for determining the 3D coordinates of these partial surfaces of the object, a processing device for assembling the 3D coordinates of the partial surfaces of the object, and a head-mounted display for displaying the assembled 3D coordinates.

14. A device in accordance with claim 13, wherein the 3D measuring device comprises a projector for projecting a pattern onto the object and a camera for recording images of the object.

15. A device in accordance with claim 14, wherein the camera records reference marks.

16. A device in accordance with claim 14, having a tracking system for determining the position and the orientation of the 3D measuring device.

17. A device in accordance with claim 13, having a photogrammetry camera.

18. A device in accordance with claim 13, wherein the head-mounted display has a data reception device for the reception of data from the processing device and/or the head-mounted display has a data transmission device for the transfer of data to the processing device.

19. A process for determining 3D coordinates of an object, comprising:

recording a partial surface of the object by a camera of a 3D measuring device, the 3D measuring device including a projector for projecting a pattern onto the object and the camera for recording images of the object;

determining 3D coordinates of the partial surface of the object;

displaying the 3D coordinates of the partial surface of the object on a head-mounted display, said head-mounted display being at least semi-transparent;

observing the object through the head-mounted display while displaying the 3D coordinates;

positioning at least one of the 3D measuring device or the object relative to each other for a second recording while observing the object on and through the head-mounted display;

recording an additional and different partial surface of the object by the 3D measuring device;

determining 3D coordinates of the additional partial surfaces; and assembling the 3D coordinates of the partial surface and the additional partial surfaces of the object by a processing device, wherein additional data is displayed on the head-mounted display, wherein the additional data displayed on the head-mounted display comprises the assembled 3D coordinates and graphically visualized spatial limitations of the measuring device to augment observation through the head-mounted display.

20. The process in accordance with claim 19, wherein the additional data displayed on the head-mounted display comprises settings of the camera.

21. A process for determining 3D coordinates of an object, comprising:

recording, by a camera of a 3D measuring device, a partial surface of the object, wherein the 3D measuring device including a projector for projecting a pattern onto the object and the camera for recording images of the object:

determining, by a processor of the 3D measuring device, 3D coordinates of the partial surface of the object;

transmitting, by the processor, the 3D coordinates of the partial surface of the object to a head-mounted display via a communication channel;

displaying, by the head-mounted display, the 3D coordinates of the partial surface of the object;
observing the object through the head-mounted display while displaying the 3D coordinates;
transmitting, by the head-mounted display, a confirmation to the processor via the communication channel, upon an operator's determining that the 3D coordinates of the partial surface of the object are correct;
storing, by the processor, the 3D coordinates of the partial surface of the object based on the confirmation transmitted from the head-mounted display;
recording, by the camera, an additional and different partial surface of the object;
determining, by the processor, another 3D coordinates of the additional and different partial surface of the object;
observing the object through the head-mounted display while displaying the another 3D coordinates;
transmitting, by the processor, the another 3D coordinates of the additional and different partial surface of the object to the head-mounted display via the communication channel;
displaying, by the head-mounted display, the another 3D coordinates of the additional and different partial surface of the object;
transmitting, by the head-mounted display, another confirmation to the processor via the communication channel, upon the operator's determining that the another 3D coordinates of the another partial surface of the object are correct;
assembling, by the processor, the 3D coordinates of the partial surface and the another 3D coordinates of the additional and different partial surface of the object by the processor based on the another confirmation transmitted from the head-mounted display; and
displaying the assembled 3D coordinates on the head-mounted display;
wherein graphically visualized spatial limitations of the 3D measuring device, in addition to the assembled 3D coordinates, are displayed on the head-mounted display to augment observation through the head-mounted display.

* * * * *